United States Patent [19]

Fox et al.

[11] Patent Number: 4,668,852

[45] Date of Patent: May 26, 1987

[54] ARC SPRAY SYSTEM

[75] Inventors: Thomas J. Fox, South Setauket; Lawrence A. Saia, Levittown; Robert F. Savill, Jr., Beechhurst; Richard D. Trapani, Flushing; Melvyn E. Turner, Wantagh, all of N.Y.

[73] Assignee: The Perkin-Elmer Corporation, Norwalk, Conn.

[21] Appl. No.: 698,305

[22] Filed: Feb. 5, 1985

[51] Int. Cl.[4] .......................... B23K 9/04; B05B 1/24

[52] U.S. Cl. .................................. 219/76.14; 239/81; 219/76.16

[58] Field of Search ....... 219/76.14, 121 PL, 121 PD, 219/121 PS, 76.16; 239/79, 80, 81, 83

[56] References Cited

U.S. PATENT DOCUMENTS

| | | | |
|---|---|---|---|
| 3,064,114 | 11/1962 | Cresswell et al. | 219/76.14 |
| 3,272,962 | 9/1966 | Mauskapf | 219/76.13 X |
| 3,632,952 | 1/1972 | Rotolico | 219/76.1 |
| 4,078,097 | 3/1978 | Miller | 219/76.13 |
| 4,095,081 | 6/1978 | Ashman | 219/76.16 |
| 4,356,971 | 11/1982 | Ashman | 239/84 |
| 4,492,337 | 1/1985 | Harrington et al. | 219/76.14 X |
| 4,512,513 | 4/1985 | Rogers | 219/76.14 X |

FOREIGN PATENT DOCUMENTS 1455862 11/1976 United Kingdom .

*Primary Examiner*—E. A. Goldberg

*Assistant Examiner*—C. M. Sigda

*Attorney, Agent, or Firm*—H. S. Ingham; F. L. Masselle; E. T. Grimes

[57] ABSTRACT

An arc spray gun has a generally frusto-conical head member of electrically insulating material, with the small end facing forwardly in the direction of spray. Wire is fed through a pair of electrically conductive tubular wire guides containing pressure contact means that extend through the head member and converge to contact the wire ends for arc formation and melting of the metal. A gas jet nozzle provides compressed gas for atomization and spraying of the molten metal. A first gas cap is disposed coaxially on the head with rear and forward gas seals so as to define an annular gas chamber. A secondary gas is supplied to the annular chamber, and the first gas cap has a pair of diametrically opposite orifices therein for directing the secondary gas from the chamber to modify the molten metal spray in a fan shape. The orifice may have elongated cross sections to produce a rough coating surface if desired. A second gas cap is adapted to replace the first gas cap in sealing relationship with only the rear gas seal so as to provide, as an option, an annular flow of the secondary gas about the wire ends. A pair of hose assemblies supply the primary and secondary gases seprately to the gun, as well as wire and arc current. A distribution block on the gun separates the gas flow and metal wire from the hose assembly.

16 Claims, 8 Drawing Figures

ARC SPRAY SYSTEM

This invention relates to an improved arc spray system involving melting the ends of two metal wires in an electric arc and spraying the resulting molten metal onto a workpiece to be coated. The invention particularly relates to an improved arc spray gun having dual channels of gas, one for atomizing the molten metal and the other for modification of the spray stream, with the capability of changing gas caps for selected types of modifications.

BACKGROUND OF THE INVENTION

Electric arc metal spray guns are well known in the art, for example, as disclosed in U.S. Pat. No. 3,632,952. The ends of two electrically isolated metal wires are melted in an electric arc struck between the wire ends, and the molten metal is atomized by compressed gas, usually air and sprayed to a workpiece to be coated. A pair of tubular electrodes 12, 12' are connected to a source of electric current, and two pairs of wire feed rollers feed the wire through each of the electrodes. (Figure numbers and reference numerals indicated herein under Background of the Invention refer to figures in the corresponding patent being referenced herein.) An air tube 14 acting as a nozzle is positioned adjacent to the ends of the electrodes 12, 12' and connected to a source of compressed air. The ends of the electrodes are fixedly secured relative to each other and to the air jet nozzle to ensure proper contact of the wires for arc formation and uniform atomization of the molten metal. In the gun device of the above-named patent a portion of the air supplied to the gun is diverted from the main stream to provide a secondary air flow in addition to the primary flow of atomizing air. A chamber 8 formed by the gun housing 4 surrounds the electrodes 12, 12' and the air jet nozzle tube 14. The chamber has a spray opening 21' and is adapted to feed the secondary air in the form of an annular stream of air about the electrodes and air jet nozzle which flows out through the spray opening, resulting in control of the spray pattern and of fineness of the molten metal.

U.S. Pat. No. 4,095,081 discloses an arc spray gun having a head 16 (FIG. 2) of electrically insulating material with two guide passages 22 therein such that the sidewalls of the passages consist of the insulating material. A contact tube 32 for connecting the wires to a source of electric current is provided at a location prior to entry of the wires into the insulated guide passages in the head. The contact tube comprises a pressure pad 36 spring-urged radially through a slot in the contact tube by a spring arm 38.

There also is provided, in the device of the aforementioned U.S. Pat. No. 4,095,081, an annular 117 (FIG. 2) extending around the arcing zone through which secondary air is diverted from the air supply to the gun which also has primary atomizing air as described above in respect to U.S. Pat. No. 3,632,952. In addition an outlet nozzle 124 with two convergent passages 128 exiting in an axial plane with the primary air passage 120 receive air that also is diverted from the air supply. The convergent flow of air from the two passages 128 causes the spraying stream to be flattened, resulting in a fan-shaped spraying stream. Flow control is provided by a spring band 133 encircling the nozzle; the band is positionally adjusted to partially or completely close the convergent passages. There is otherwise no provision for interchanging between the annular and convergent flows or independently controlling these and the atomizing air.

U.S. Pat. No. 4,356,971 shows a gun similar to that described in U.S. Pat. No. 4,095,081 and additionally discloses a pair of supply conduits 18 (FIG. 3) connected to the gun, each of which supplies both electric power and air under pressure to the gun, the total amount of air being supplied from both conduits in sufficient quantity for the establishment of both the atomizing air and the operation of an air motor 42 (FIG. 2) to drive the wires. A manifold is utilized in which the air supplies from both conduits are combined prior to separation for delivery through separate passages to the air jet and the air motor drive.

It is also known to enclose a wire guide tube in a hose assembly that also provides air and power, as indicated in an advertising brochure entitled "Coaken Arc Spraying System" by Coaken Corporation, Japan, dated 1977.

A primary object of the present invention is to provide an arc spray system having an improved capability for modifying the spray of molten metal.

Another object of the invention is to provide an arc spray system having novel means for interchanging gas caps to modify the spray of molten metal.

Yet another object is to provide an improved, compact arc spray system having a capability for modifying the spray of molten metal.

SUMMARY OF THE INVENTION

The foregoing and other objects of the present invention are achieved by an arc spray system that includes an arc spray gun having a generally frusto-conical head member, preferably of electrically insulating material, with the small end facing forward, i.e., in the direction of spray. Wire is fed through a pair of tubular wire guides which extend through the head member and converge to contact metal wire ends for arc formation and melting of the metal. Desirably the tubular wire guides include pressure electrical contact means mounted substantially within the head member for connecting the wires to the source of arc current. There are two gas flows, designated herein as primary and secondary. A gas jet nozzle provides compressed gas which is the primary gas for atomizing and spraying the molten metal. A gas cap is disposed coaxially on the head with rear and forward gas seals so as to define an annular gas chamber. Another gas flow, the secondary gas, is supplied to the chamber, and the gas cap has at least one orifice therein for directing the secondary gas to modify the molten metal spray, for example, in a fan shape. The orifices may have elongated cross sections to produce a rough coating surface if desired.

There is another gas cap configured differently than the above-described (first) gas cap. The second gas cap is adapted to substitute for the first gas cap in sealing relationship with the rear gas seal, while having an inner surface diameter adjacent to the forward gas seal sufficiently large to render the forward gas seal inoperative to provide an annular flow of the secondary gas about the wire ends.

In a preferred embodiment, each of a pair of hose assemblies contains a hose component to supply the primary and secondary gases to the gun, a gas impervious wire guide in the hose component, arc current conductor and electrical control leads. An end tube connected to the hose component of each assembly terminates with and is sealed coaxially to an electrically insulated terminal tube that is sealed coaxially to the end of the wire guide tube. The axial aperture of the terminal tube provides an exit that directs the wire toward the wire guide while retaining the gas. The end tubes are each sealingly engaged in a bore in a distribution block in the gun so as to form an annular passage in each bore. A hole in the wall of the end tube directs gas from the hose component to the annular passage. Two gas passages each intersect an annular passage, and the primary and secondary gases are then respectively directed from these to the gas jet nozzle and head member.

DETAILED DESCRIPTION OF THE INVENTION

Figure 1:
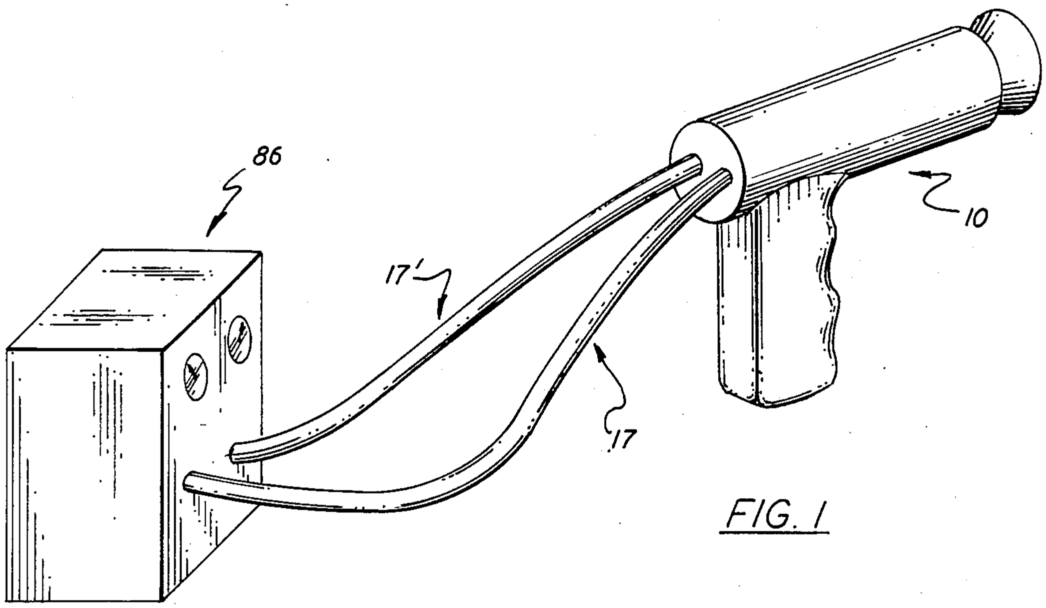
FIG. 1 shows diagramatically an arc spray system.
Figure 2:
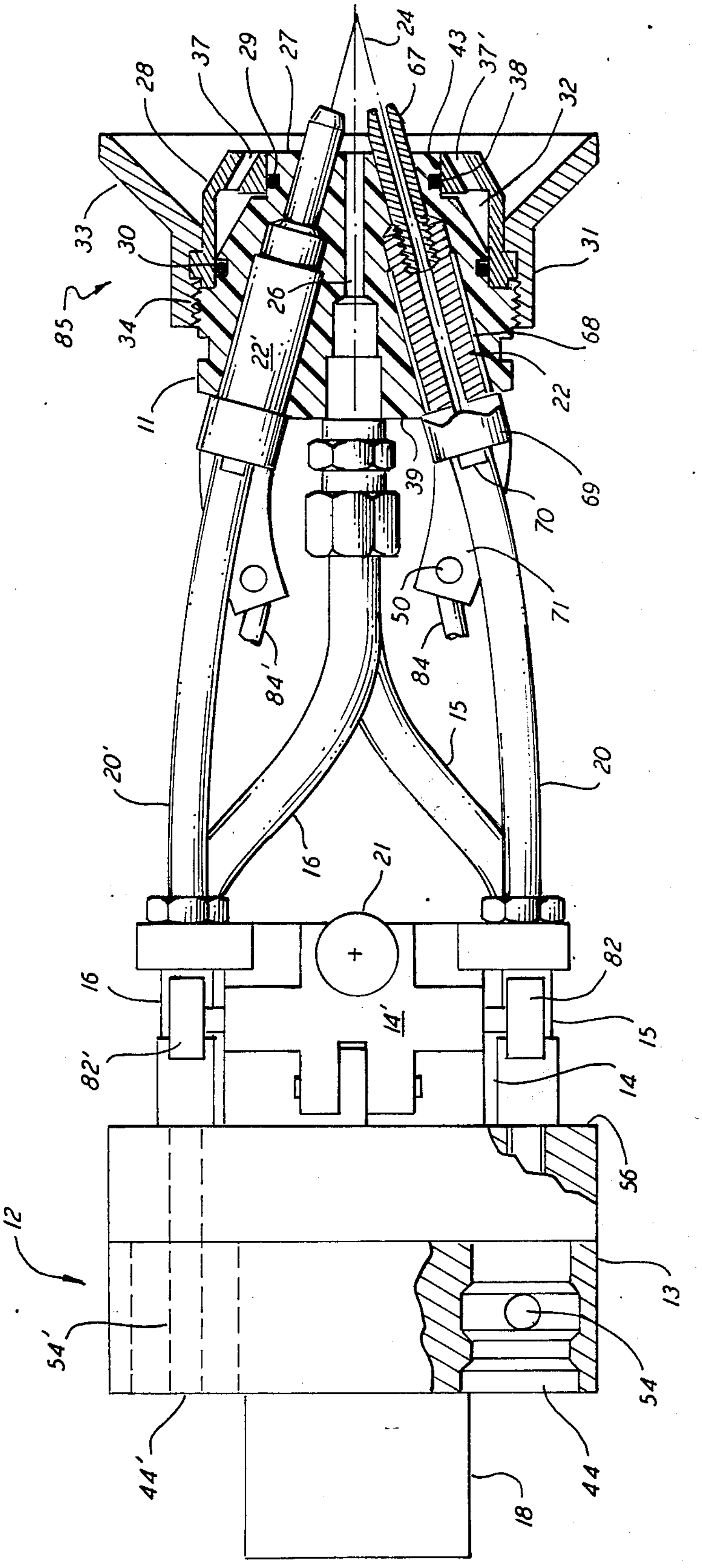
FIG. 2 a top view, partially in horizontal section, of an arc spray gun and hose assembly of this invention incorporating a gas cap.
Figure 3:
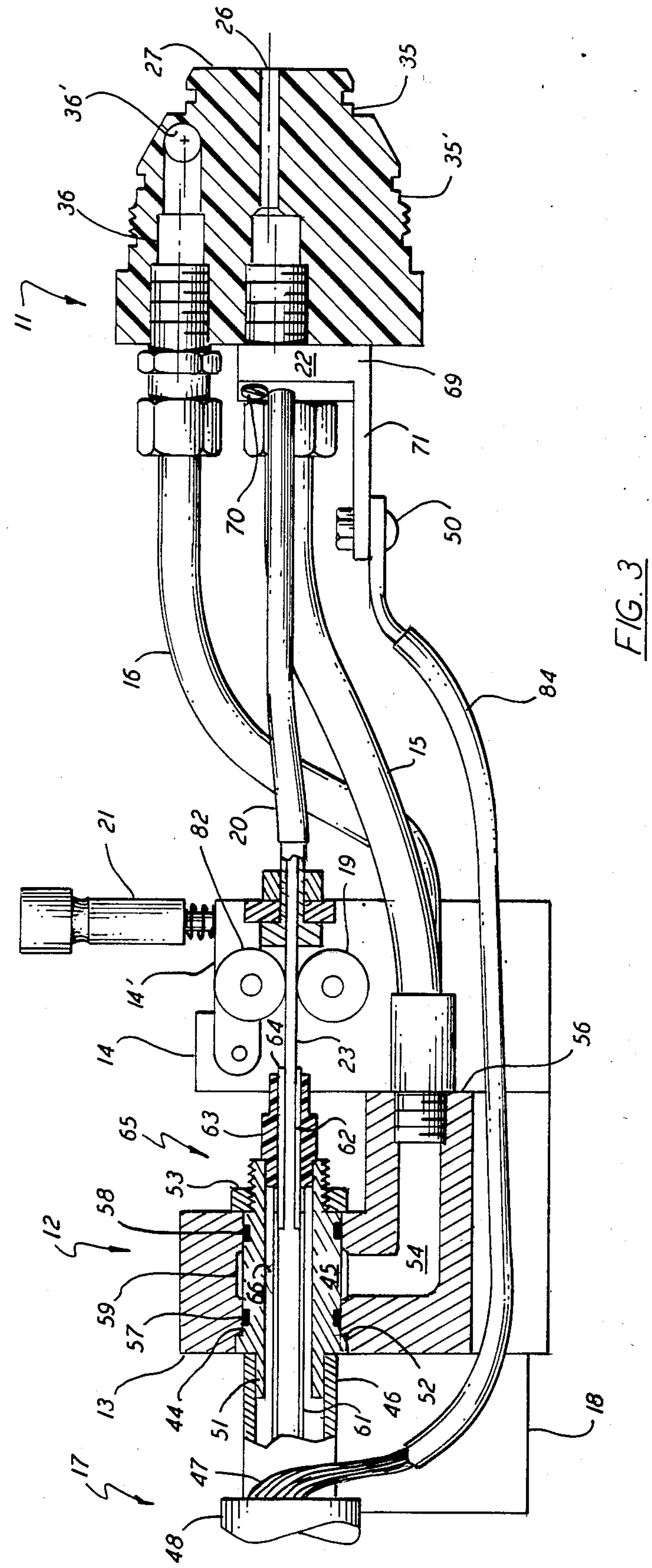
FIG. 3 is a side view, partially in vertical section, of the arc spray gun of FIG. 2, with gas cap omitted.

FIG. 1 indicates the basic components of an arc spray system of the present invention, namely an arc spray gun 10, a console 86 which supplies two metal spray wires, gas, arc current and control leads, and two flexible hose assemblies 17, 17' that carry the wires, gas, power and leads to the gun. FIG. 2 and FIG. 3 show the arc spray gun 10 in detail. A head assembly 85 at the forward end of the gun is comprised of a head member 11 with two converging tubular wire guides 22, 22' and an atomizing gas jet nozzle 26 therebetween. The head member is formed preferably of insulating material, for example phenolic resin or machinable ceramic, having heat and arc radiation resistance. A distribution block 12 at its rear end has two components, namely a distribution component 13 and a wire drive component 14. Distribution block 12 and head assembly 85 are held in fixed relationship, preferably by means of two rigid gas pipes 15, 16 fitted into standard thread joints in the block and head member.

A small, variable speed electric motor 18 is mounted on distribution block 12 and, by way of a pair of engaged crossed-helical gears (not shown) that are internal to the distribution block, drives respective electrically insulated wire feed rollers (one of a pair shown at 19, FIG. 3) which, in turn, feed wire through wire feed tubes 20, 20' toward head member 11. Roller tension is maintained on the wires in a wire drive assembly 14' by means of a known type of spring tension device 21 and insulated idler rolls 82, 82'. The wire feed tubes are positioned to curve from the distribution block to converging tubular wire guides 22, 22' (FIG. 2) in the head member and are preferably formed of a flexible plastic, for example PTFE (Teflon) or, preferably nylon containing a solid lubricant such as molybdenum disulfide.

Tubular wire guides 22, 22' are mounted substantially within head member 11 and converge in a forward direction at an included angle of about 30° such that metal wires feeding therethrough will contact each other at a point 24 located about 2.5 cm forward of the head member. With a source of arc current applied to the wires, an electric arc will be formed thus melting the wire ends. An axially oriented, primary gas jet nozzle 26 placed centrally between and in the plane of wire guides 22, 22' directs a jet of primary gas such as argon or nitrogen, or preferably compressed air, to the molten wire ends to uniformly atomize and propel a spray stream of molten metal particles to a substrate for deposition. Gas jet nozzle 26 is connected to receive the gas by way of gas pipe 15. Alternatively, two or more gas jet nozzles may be utilized as in aforementioned U.S. Pat. No. 3,632,952.

Head member 11 is configured to provide a secondary supply of gas for modifying the spray stream. The head member 11 has a generally tapered or frusto-conical configuration with its small end 27 (FIG. 3) facing forward. (As used herein, terms "forward" and terms derived therefrom or synonymous or analogous thereto, have reference to the direction in which the molten metal spray stream is propelled toward the workpiece; similarly "rearward", etc., denotes the opposite direction.) A set of at least two interchangeable gas caps is provided as described in detail hereinbelow. Selectively one of the gas caps is disposed coaxially on the head member 11 in order to direct the secondary gas toward the spray stream in order to modify the same, for example, to affect the fineness of the molten particles or to deflect the stream or to change the pattern or shape of the stream.

Specifically, as shown in FIG. 2, a gas cap 28 of generally cup-shaped configuration is disposed in a coaxial position on the head member. Two gas seals such as O-ring seals 29, 30 are interposed in suitable grooves between the head member and the gas cap. One O-ring 29 is located forwardly, i.e., near the small end 27 of the head member. The second O-ring 30 is spaced rearwardly a distance sufficient to define a sealed annular gas chamber 32 between gas cap 28 and head member 11. Gas cap 28 is held in place on head member 11 by a retaining ring 31 that is desirably combined with a conical radiation shield 33, threaded onto the head member at 34.

The term "frusto-conical" in reference to the head member is used broadly herein and in the claims to denote a configuration in which the relative dimensions of the diameters of first and second O-ring seals 29, 30 and threaded joint 34 are sufficient to allow removal and replacement of gas cap 28 forwardly with respect to head member 11.

A gas duct 36 (FIG. 3) is provided in the head member so as to connect annular gas chamber 32 to the gas source by way of gas pipe 16. Desirably the duct has two branches formed by a perpendicular through-hole 36' to introduce the secondary gas into annular gas chamber 32 in opposing directions at low velocity to minimize vortex flow.

Gas cap 28 (FIG. 2) has a forwardly facing axial opening 43 encompassed by an annular surface 38, situated approximately in the plane of the small end 27 of head member 11, in which there is at least one set of orifices comprising at least one orifice 37 directed from annular gas chamber 32 in a generally forward direction, and/or toward the axis of the spray, so as to modify the spray stream, for example by deflecting the stream.

In the preferable embodiment shown in FIG. 2 a second orifice 37' is located diametrically opposite to the first orifice 37 and both orifices converge toward the axis of the unshaped spray stream (i.e., without secondary gas) at an angle of about 35° to said axis for producing a fan shaped spray stream. In one practical embodiment with orifice diameters of 3.5 mm, exiting from a 3.22 cm coaxial circle on annular surface 38, and an air pressure of about 4.5 bar (68 p.s.i.), an excellent fan spray is produced for rapid coating of broad surfaces. The fan may be oriented as desired by rotating the gas cap on the O-rings. A typical fan width of 35 cm at 30 cm spray distance is produced, producing quite uniform coating thickness across the deposition pattern.

Figure 5:
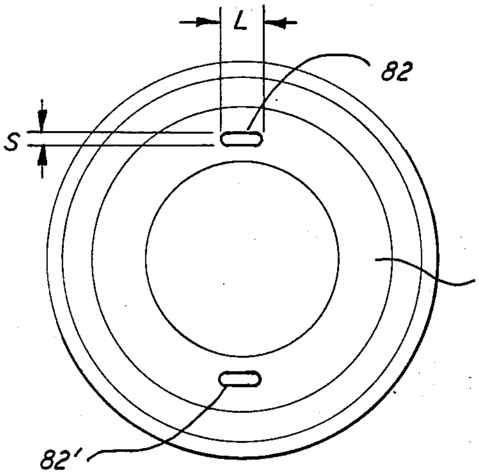
FIG. 5 is a front view of one embodiment of a gas cap of this invention.
Figure 6:
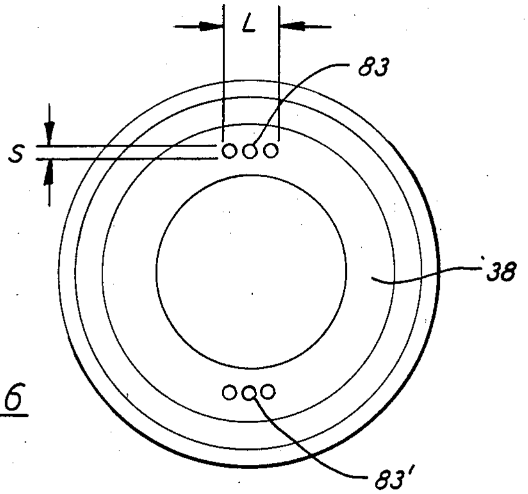
FIG. 6 is a front view of an alternative embodiment of a gas cap of this invention.

In an alternative configuration (FIG. 5) for the abovedescribed gas cap, each orifice 82, 82' is slot shaped with an elongated cross section or, optionally, a set of orifices is formed of a row or other cluster of two or more smaller orifices, for example three orifices 83, 83' (FIG. 6) in place of each elongated orifice. The long cross-sectional dimension of each slot of cluster in a system of orifices is tangential to a circle lying coaxially on annular surface 38, i.e., coaxially with the axis of symmetry of the metal spray. Preferably an elongated orifice is used as in FIG. 5 which has a long dimension L of about 6 mm and a short dimension S of about 1.6 mm. Generally the ratio L/S of the long dimension L to the short dimension S should be between about 1.5 and 10. Where such a ratio L/S, as used herein and in the claims, applies to a cluster system of orifices, the long and short dimensions may be determined from a simple oblong shape closely enscribing the cluster. The elongated orifice type of gas cap was discovered to produce a fan spray coating having coarse textured surface. Such coatings sprayed of aluminum are useful, for example, for vehicle traction on a steel deck surface.

Figure 4:
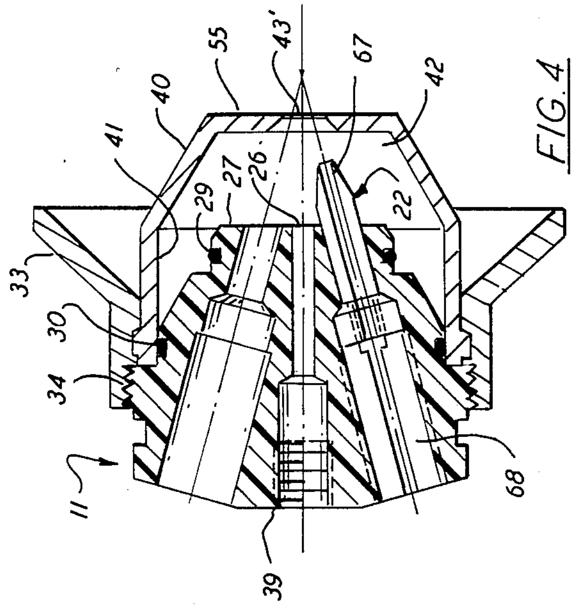
FIG. 4 is a top view, in horizontal section, of a head assembly of this invention incorporating an alternative gas cap.

FIG. 4 shows in place on the head member a second type of gas cap 40 which is also of generally tubular configuration and is a substitution for the first (e.g., fan-type) gas cap 28. However, the inner surface diameter 41 of the second cap 40 is larger than the diameter of the forward O-ring 29 (which thus does not seal with the second cap) so as to allow passage of the secondary gas into an outer chamber 42 toward or forward of the small end 27 of the head member 11. A forwardly facing axial opening 43' in the forward face 55, for example of about 8 mm diameter located about 12 mm from the small end 27, i.e., approximately in the plane of convergence of the wire ends, supplies an annular flow of gas about the arc. With an air pressure of about 4.5 bar (68 p.s.i.) very fine textured coatings of uniform thickness are produced thereby. Such fine coatings of zinc are desirable, for example, for electrical shielding for containers of electronic systems.

As described hereinabove rigid gas pipes 15, 16 provide a support for head member 11 relative to distribution block 12. Gas pipe 15 is attached axially to the back 39 of the head member at the primary gas jet nozzle 26 and the second gas pipe 16 is attached off-center to the back of the head member at secondary gas duct 36. The gas pipes are appropriately curved as indicated in FIG. 2 and FIG. 3 to connect with respective gas passages at distribution block 12.

The present invention provides for the primary and secondary gas supplies to be regulated independently, preferably from console 86 (FIG. 1). Thus the gas flows each can be set for optimum atomization and modification of the molten metal spray stream.

Distribution block 12, as illustrated in FIG. 2 and FIG. 3, has two distribution bores 44, 44' therein that are parallel to each other and axial with the wire paths leading to the respective wire feed tubes 20, 20'. As indicated in FIG. 3 an end tube assembly 64 of hose assembly 17 carrying metal spray wire 23 is inserted in bore 44. Hose assembly 17', has a similar end tube assembly (not shown) situated in distribution bore 44'.

As appears in FIG. 3, each hose assembly is of generally coaxial construction. A hose component 46, which carries the gas under pressure, has distributed about it stranded copper conductor 47 sufficient to carry the several hundred amperes required for the arc. An outer sheath 48 covers the copper strands serving as an insulator and protective covering. The strands are separated from the hose assembly just rearward of the distribution block 12, bundled, covered with an insulation layer to form a cable 84 and led forward to a point of connection 50 to wire guide 22 which, as described hereinbelow, provides electrical contact with metal wire 23. A similar connection via cable 84' is made from hose assembly 17' to second wire guide 22' (FIG. 2). Insulated electrical leads (not shown) may be carried from the console through the hose assembly along with the copper strands for operation of the motor, switches and the like on the gun.

Continuing with reference to FIG. 3, the end of the hose component 46 is sealed over an annular protrusion 51 of end tube 45 of end tube assembly 64 which functions to couple hose assembly 17 to distribution block 12. The end tube is removably positioned in the distribution bore 44 by shoulder 52 and held in place by threaded nut 53. A pair of O-ring seals 57, 58 are positioned to seal end tube 45 in distribution bore 44, on either side of a gas passage 54. End tube 45 has a hole 66 in the wall thereof between the O-rings 57, 58. Distribution bore 44 has an enlarged diameter portion between the O-rings to define an annulus 59, thus providing a gas connection between hose component 46 and gas passage 54.

Gas passage 54 intersects and terminates with distribution bore 44, and curves at a right angle to exit at a forward-facing surface 56 on distribution block 12. Gas pipe 15 is threaded into the gas passage at said surface 56, completing a gas channel from the hose component 46 to the primary atomizing gas jet nozzle 26. A corresponding gas passage 54' (FIG. 2) carries the secondary gas from the second hose assembly 17' via distribution bore 44' to gas pipe 16 and thus to gas duct 36 in head member 11.

Within hose component 46 is a wire guide tube 61, which has an outer diameter that is smaller than the inside diameter of the hose component as to allow ready passage of gas therebetween. Wire guide tube 61, desirably of similar material and construction as the wire feed tubes 20, 20', is continued into end tube 45 to a point where it is sealed over a part of a terminal tube 62 which protrudes rearwardly from a sealing member 63, formed of electrically insulating material, which in turn coaxially holds terminal tube 62 and end tube 45, completes the gas seal for end tube assembly 64, and electrically isolates metal spray wire 23. The wire passes from wire guide tube 61 through terminal tube 62 and out end aperture 65 of the terminal tube.

A pair of distribution systems (not shown) comparable to the end tube assembly and distribution block are also located in console 86 (FIG. 1) to introduce the power, gas and wire into hose assemblies 17, 17'.

Figure 7:
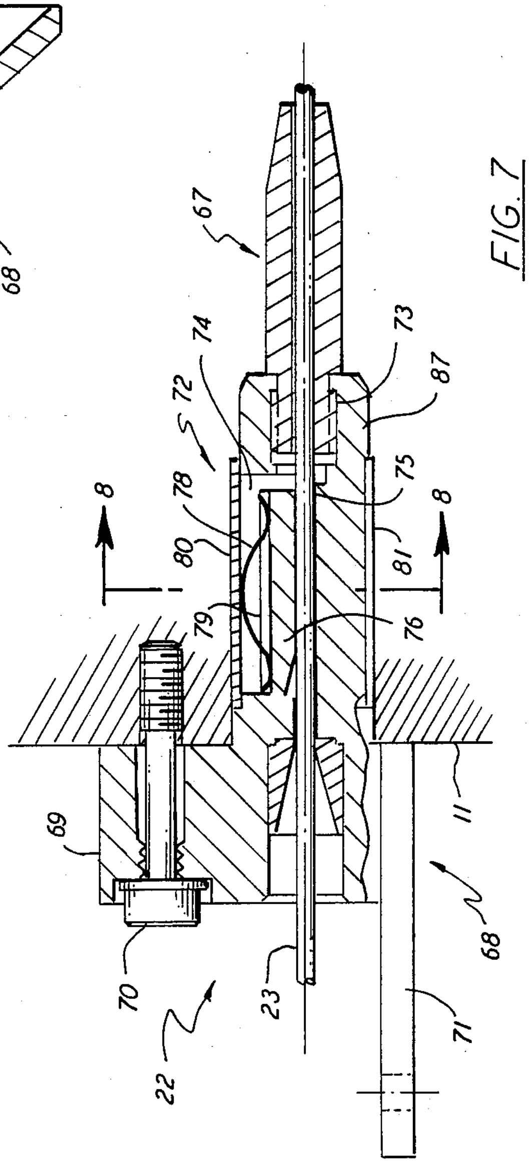
FIG. 7 is a side view, in vertical section, of a hollow wire guide of this invention.

Tubular wire guides 22, 22' are preferably made of conductive metal such as copper or copper alloy and extend through head member 11 (FIG. 2) such that electrical contact with the wire is made primarily within the head member. As shown in detail in FIG. 7, one of the wire guides (22 is illustrated) comprises a tubular forward portion 67 and rearward portion 68. The rearward portion, in turn, includes a guide body 87, a mounting bracket 69 which holds the wire guide in the head member (see also FIG. 2 and FIG. 3) by means of a screw 70, a connection plate 71 extending rearward from the bracket, and a contact assembly 72 extending forwardly from the bracket inside the head member. The tubular forward portion 67 is secured coaxially with a threaded joint 73 forward of contact assembly 72 and protrudes forwardly (approximately 9 mm in a preferable embodiment) from the small end of the head member. A portion of metal spray wire 23 is illustrated in the hollow wire guide.

Figure 8:
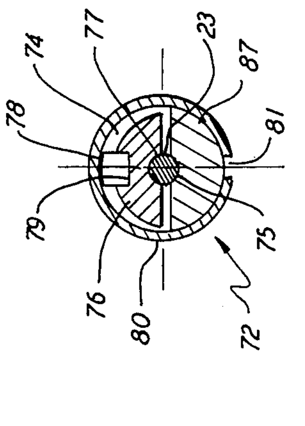
FIG. 8 is a sectional view taken at 8—8 of FIG. 7.

Contact assembly 72 (also depicted in FIG. 8) is located about a longitudinal cutaway 74 in guide body 87 that leaves remaining, as a contact section 75, essentially the lower half of the guide body for a distance of, for example, about 2 cm. An elongated pad 76 is of generally hemi-cylindrical shape and has a longitudinal hemi-cylindrical slot 77 (FIG. 8) on the longitudinal flat face which contacts the wire. A yoke-shaped leaf spring 78 riding in a shallow longitudinal slot 79 in the cylindrical surface of the pad is retained with a demountable tubular member 80 having a longitudinal split 81 therein. Alternatively, tubular member 80 may comprise the bore in head member 11 functioning to hold contact assembly 72. Thus, pad 76 is maintained under pressure on the wire as the wire is moving through the wire guide, providing effective electrical contact between the wire and the guide. As the contact is applied inside the head member near the wire end there is a minimum of power loss in the wire and the construction enables a small, compact assembly to fit conveniently in the head member.

An appropriate cover or housing, with a handle, may be installed on the arc spray gun as shown generally with respect to gun 10 in FIG. 1. The combination of the head member with its replaceable gas caps and internal contact assemblies, together with the distribution block as described herein provides for a versatile and compact unit. There is ability to provide a variety of secondary air flows affecting the spray stream producing, for example, fan spray and controlled fineness of the spray. This versatility is achieved by a simple replacement of the gas cap, utilizing the optional engagement of an O-ring seal in the head member. Gas, preferably compressed air, is supplied through two independent passage systems to the head member, one for the atomizing jet and the other for secondary gas modification of the spray. The independent systems preferably involve two hose assemblies, each carrying a supply of gas as well as one leg of power supply and one metal wire, which are separated at the distribution block as described herein. The result is a gun which also may be light weight, with only the two external hose connections, and is especially useful for hand spraying.

While the invention has been described above in detail with reference to specific embodiments, various changes and modification which fall within the spirit of the invention and scope of the appended claims will become apparent to those skilled in this art. The invention is therefore only intended to be limited by the appended claims or their equivalents.

What is claimed is:

1. In an arc spray system for melting respective spraying ends of two electrically isolated metal wires in an electric arc struck between the wire ends and spraying the resulting molten metal, an arc spray gun which comprises:

(a) a head member having a generally frusto-conical configuration with a small end facing foward, a pair of electrically isolated tubular wire guides extending through the head member and converging toward the small end thereof so as to insure proper contact between respective spraying ends of two metal wires for formation of an arc and molten metal generated thereby, a gas jet nozzle adapted for connection to a primary source of compressed gas and positioned with respect to the ends of the tubular wire guides to provide uniform atomization of the molten metal, means for connecting the metal wires to a source of arc current, and means for feeding the metal wires respectively through each tubular wire guide;

(b) a first gas cap of cup-shaped configuration with a forwardly facing surface having an opening therein, disposed in a coaxial position on the head member and cooperating with the head member to define a gas chamber therebetween, with rear and forward gas seals interposed between and in sealing relationship with the head member and the first gas cap at locations, respectively, rearward and forward of the gas chamber, thereby sealing the gas chamber, the head member having a gas duct therein adapted for connection to a secondary source of compressed gas and communicating with the gas chamber, and the first gas cap having at least one orifice therein communicating with the gas chamber for directing the secondary gas so as to modify the molten metal spray; and (c) a second gas cap of cup-shaped configuration with a forwardly facing opening therein, adapted to interchange with the first gas cap on the head member in sealing relationship with the rear gas seal, having an inner surface diameter adjacent to the forward gas seal sufficiently large to render at least a portion of the forward gas seal inoperative, so as to provide a generally forward flow of the secondary gas generally toward the molten metal spray.

2. An arc spray system according to claim 1 wherein the head member is formed of electrically insulating material.

3. An arc spray system according to claim 1 wherein the first gas cap has two diametrically opposite orifice systems therein converging forwardly so as to direct the secondary gas to shape the metal spray in the form of a fan.

4. An arc spray system according to claim 3 wherein the metal spray has a symmetry axis and each orifice system has an elongated cross section with a long dimension tangential to a circle coaxial with the symmetry axis.

5. An arc spray system according to claim 4 wherein each orifice system comprises an orifice with an elongated cross section having a ratio of the maximum dimension of the cross section to the minimum dimension between about 1.5 and about 10.

6. An arc spray system according to claim 1 wherein the second gas cap has an inner surface diameter adjacent to the forward gas seal sufficiently large to render the forward gas seal inoperative, so as to provide an annular flow of the secondary gas about the wire ends.

7. An arc spray system according to claim 2 wherein the tubular wire guides are formed of electrically conductive material, mounted substantially within the head member and connected to the source of arc current.

8. An arc spray system according to claim 2 wherein the head member has two head bores therein, and each tubular wire guide comprises an electrical pressure contact assembly mounted substantially within a corresponding head bore in contact relationship with the head member, and is connected to the source of arc current.

9. An arc spray system according to claim 8 wherein each pressure contact assembly comprises a contact section of the tubular wire guide having a cutaway extending to the wire therein, an elongated pad loosely fitted over the wire in the cutaway, a leaf spring lying on the pad to cause pressure thereof against the wire and a tubular member fitted over the contact section, pad and leaf spring to retain the contact assembly.

10. An arc spray system according to claim 1, wherein:

the arc spray system further comprises first and second hose assemblies which comprise respective first and second hose components having source ends connected, respectively, to the primary and secondary sources of compressed gas, first and second means for conducting arc current between the arc spray gun and the source of arc current and first and second means for guiding the metal wires to the arc gun; and the arc spray gun further comprises a distribution block affixed in alignment with and rearward of the head member and to which the hose assemblies are each connected, comprising means for separating the primary and secondary gas flows and metal wires from the respective hose assemblies, and additionally comprises means to channel the primary and secondary gas flows respectively to the gas jet nozzle and the gas chamber.

11. An arc spray system according to claim 10, wherein:

each first and second guide means comprises a gas-impervious flexible wire guide tube loosely enclosed in the respective hose component;

the respective first and second hose component each has a gun end for connecting to the arc spray gun, and the first and second hose assemblies further comprise, respectively, first and second end tubes sealingly engaged with the respective gun ends so as to receive gas flow therefrom, each end tube coaxially terminating in an electrically insulated terminal tube sealed coaxially to the corresponding end of the respective wire guide tube and having an axial aperture therein to provide an exit for directing metal wire toward the respective wire guide while retaining the respective primary and secondary gas;

the distribution block has first and second distribution bores therein with axes generally parallel to the axis of the head member, and further has first and second gas passages therein intersecting, respectively, the first and second distribution bores, the first and second end tubes being sealingly engaged, respectively, in the first and second distribution bores with relative diameters such as to form an annular passage between each distribution bore and the respective end tube, each end tube having a hole in the wall thereof for directing the gas flow from the respective hose component to the respective annular passage; and the arc spray gun further comprises a first gas pipe connected between the first gas passage and the gas jet nozzle, and a second gas pipe connected between the second gas passage and the gas duct in the head member.

12. An arc spray system according to claim 10 wherein the head member is formed of electrically insulating material, the tubular wire guides are formed of electrically conductive material mounted substantially within the head member, and the conducting means of each hose assembly comprises a stranded copper conductor that is juxtaposed externally to the hose component and thence extended to a point of connection to the respective tubular wire guide.

13. An arc spray system according to claim 11 wherein the first and second gas pipes are formed of rigid material to provide relative support between the head member and the distribution block.

14. An arc spray system for melting respective spraying ends of two metal wires in an electric arc struck between the wire ends and spraying the resulting molten metal, comprising:

an arc spray gun which comprises an electrically insulating head member having a generally frustoconical configuration with a small end facing forward, a pair of tubular wire guides extending through the head member and converging toward the small end thereof so as to insure proper contact between respective spraying ends of two metal wires for formation of an arc and molten metal generated thereby, a gas jet nozzle positioned with respect to the ends of the wire guides for ejecting compressed primary gas to uniformly atomize the molten metal, and means for feeding the metal wires respectively through each tubular wire guide, each tubular wire guide comprising an electrically conductive pressure contact means mounted substantially within the head member and connected to a source of arc current;

a first gas cap of generally cup-shaped configuration with a forwardly facing surface having an opening therein, disposed in a coaxial position on the head memeber and cooperating with the head member to define a gas chamber therebetween, with rear and forward gas seals interposed between the head member and the first gas cap at locations, respectively, rearward and forward of the gas chamber, the head member having a gas duct therein adapted for connection to a secondary source of compressed gas and communicating with the gas chamber, and the first gas cap having at least one orifice therein communicating with the gas chamber for directing the secondary gas so as to modify the molten metal spray;

a second gas cap of generally cu-shaped configuration with a forwardly facing opening therein, adapted to interchange with the first gas cap on the head member in sealing relation ship with the rear gas seal, having an inner surface diameter adjacent to the forward gas seal sufficiently large to render the forward gas seal inoperative, so as to provide an annular flow of the secondary gas about the wire ends;

a distribution block affixed in alignment with and rearward of the head member, having first and second distribution bores with axes generally parallel to the axis of the head member, and further having first and second gas passages therein intersecting, respectively, the first and second distribution bores, and means to channel gas from the first and second gas passages, respecitvely, to the gas jet nozzle and to the gas duct in the head member;

first and second hose assemblies which comprise, respectively, first and second hose components having source ends connected, respectively, to primary and secondary sources of compressed gas, a pair of gas-impervious flexible wire guide tubes each loosely enclosed in the respective hose component, and means for conducting arc current between a source of arc current and the pressure contact means; and a pair of end tubes each sealingly connected to a gun end of the respective hose component, terminating in an electrically insulated terminal tube and having an axial aperture therein sealed to the corresponding end of the wire guide tube to provide an exit for directing metal wire toward the respective wire guide while retaining the respective primary and secondary gas, and being sealingly engaged in the respective distribution bore with relative diameters such as to form an annular passage between the distribution bore and the end tube, and end tube having a hole in the wall thereof for directing the gas flow from the hose component to the annular passage.

15. An arc spray gun for melting respective spraying ends of two metal wires in an electric arc struck between the wire ends and spraying the resulting molten metal, comprising:

a pair of electrically isolated tubular wire guides converging so as to insure proper contact between respective spraying ends of two metal wires for formation of an arc and molten metal generated thereby, a gas jet nozzle connected to a primary source of compressed gas and positioned with respect to the ends of the tubular wire guides to provide uniform atomization and a spray pattern of the molten metal, means for connecting the metal wires to a source of arc current, and means for feeding the metal wires respectively through each tubular wire guide; and a gas cap disposed about the tubular wire guides having two diametrically opposite orifice systems therein connected to a secondary source of compressed gas and converging forwardly so as to direct the secondary gas to shape the metal spray pattern in the form of a fan, wherein the metal spray pattern has a symmetry axis and each orifice system has an elongated cross section with a long dimension tangential to a circle coaxial with the symmetry axis.

16. An arc spray gun according to claim 15 wherein each orifice system comprises an orifice with an elongated cross section having a ratio of the maximum dimension of the cross section to the minimum dimension between about 1.5 and about 10.

* * * * *